(12) United States Patent
Kawato et al.

(10) Patent No.: US 7,969,691 B2
(45) Date of Patent: Jun. 28, 2011

(54) MAGNETIC HEAD AND MAGNETIC DISK SYSTEM HAVING A READ SENSOR AND A SENSING CURRENT

(75) Inventors: Yoshiaki Kawato, Odawara (JP);
Chiseki Haginoya, Tokyo (JP); Kaori Suzuki, Mitaka (JP)

(73) Assignee: Hitachi, Ltd., Tokyo (JP)

( * ) Notice: Subject to any disclaimer, the term of this patent is extended or adjusted under 35 U.S.C. 154(b) by 742 days.

(21) Appl. No.: 12/014,128

(22) Filed: Jan. 15, 2008

(65) Prior Publication Data
US 2008/0212239 A1 Sep. 4, 2008

(30) Foreign Application Priority Data

Jan. 17, 2007 (JP) .................. 2007-008171
Dec. 7, 2007 (JP) .................. 2007-317032

(51) Int. Cl.
*G11B 5/39* (2006.01)
(52) U.S. Cl. ...................................... 360/317
(58) Field of Classification Search .................. 360/317, 360/318, 319, 119.02, 123.02, 123.12
See application file for complete search history.

(56) References Cited

U.S. PATENT DOCUMENTS

| | | | |
|---|---|---|---|
| 5,073,836 A | 12/1991 | Gill et al. | |
| 5,255,141 A * | 10/1993 | Valstyn et al. | 360/321 |
| 5,311,387 A * | 5/1994 | Mallary | 360/125.02 |
| 5,726,839 A * | 3/1998 | Shinohara et al. | 360/318 |
| 6,101,067 A * | 8/2000 | Matsuzono et al. | 360/317 |
| 6,430,010 B1 * | 8/2002 | Murdock | 360/319 |
| 6,452,759 B2 * | 9/2002 | Urai | 360/318 |
| 6,710,984 B1 * | 3/2004 | Yuasa et al. | 360/324.11 |
| 6,954,340 B2 * | 10/2005 | Shukh et al. | 360/317 |
| 7,180,704 B2 * | 2/2007 | Mochizuki et al. | 360/123.12 |
| 7,616,403 B2 * | 11/2009 | Ho et al. | 360/125.01 |
| 7,684,149 B2 * | 3/2010 | Mochizuki et al. | 360/125.3 |
| 7,729,092 B1 * | 6/2010 | Mallary et al. | 360/317 |
| 2002/0051330 A1 * | 5/2002 | Heijden et al. | 360/324 |

FOREIGN PATENT DOCUMENTS

JP  62-262213  11/1987
JP  2006-277834  10/2006

OTHER PUBLICATIONS

S. Iwasaki, "Perpendicular Magnetic Recording—Evolution and Future—", IEEE Transactions on Magnetics, vol. 20, No. 5, Sep. 1984.

* cited by examiner

*Primary Examiner* — Angel A. Castro
(74) *Attorney, Agent, or Firm* — Antonelli, Terry, Stout & Kraus, LLP.

(57) ABSTRACT

A read sensor is disposed near a main pole, thereby reducing the distance between the read sensor and a write sensor. In this case, however, a magnetic field generated from the main pole affects magnetization of a free layer and a pinned layer of a magnetoresistive film, thereby causing the magnetizing directions to rotate, a magnetic barrier to be generated, and the read property to be degraded. According to the present invention, a main pole and a yoke configure a magnetic circuit together with a sub-pole and a soft magnetic under layer of the magnetic disk and an exciting coil magnetizes the magnetic circuit, thereby a recording magnetic field is applied to a recording layer to record information bits on the layer. And in order to sharpen the magnetic field distribution generated by the main pole, a trailing shield made of a ferromagnetic material is disposed at the trailing side of the main pole adjacently. And a read sensor (magnetoresistive element) for reading bit information is provided between the trailing shield and the main pole.

15 Claims, 16 Drawing Sheets

MAGNETIC HEAD AND MAGNETIC DISK SYSTEM HAVING A READ SENSOR AND A SENSING CURRENT

CLAIM OF PRIORITY

The present application claims priority from Japanese application JP 2007-008171 filed on Jan. 17, 2007 and JP 2007-317032 filed on Dec. 7, 2007, the contents of which are hereby incorporated by reference into this application.

FIELD OF THE INVENTION

The present invention relates to a magnetic head and a magnetic recording system, particularly a perpendicular recording thin film magnetic head for realizing high density magnetic recording and a magnetic disk drive that uses the same.

BACKGROUND OF THE INVENTION

Along with the progress of the information processing technology, information digitalizing has been advanced in various fields. In addition to personal computers and servers that are conventional typical hardware items, it is now strongly required to store mass digital data in electric home appliances, audio and medical apparatuses, and others. In order to meet such requirements, magnetic disk drives (HDD) that are core of non-volatile file systems have been demanded rapidly to store such mass digital data more than ever. Realizing a large capacity magnetic disk drive means improvement of an area recording density, that is, a recording bit density on a medium. And in order to increase such an area recording density, the following three requirements must be satisfied simultaneously, concretely (1) realizing high SNR (realizing reduction of diameters of medium crystal grains and high sensitivity of the subject reading head), (2) keeping the heat resistance to demagnetization (increasing of a medium magnetic anisotropy energy Ku), (3) securing of write-ability (increasing the recording head magnetic field in narrow tracks).

The longitudinal recording having been adopted since the birth of the HDD uses a magnetic flux leaked slightly from a pole gap, so that the limit of the above (3) is especially exceeded at the area recording density of about 100 Gb/in$^2$. The perpendicular recording method has been proposed to exceed the limit of the longitudinal recording. The perpendicular recording magnetizes the subject medium recording layer perpendicularly to the film surface and the recording principles differ from those of the conventional longitudinal recording media (IEEE Transactions on Magnetics, Vol. 20, No. 5, September 1984). Particularly, when a soft magnetic under layer is provided between a medium recording layer and a substrate and a single pole write sensor is used, a magnetic flux flows into the recording layer directly. Thus the recording magnetic field is larger than that of the longitudinal recording. In addition, because the perpendicular recording enables antiparallel array of adjacent magnetizations without making them face each other, thereby avoiding influences of demagnetizing fields. This is why it is expected to narrow the magnetization transition area significantly, thereby the linear recording density can be improved with high SNR. Furthermore, it is known that because the requirement for thinning the medium film is not so strong than that of the longitudinal recording, high thermal stability to demagnetization can be secured.

There have been proposed various types of magnetic heads conventionally to realize the perpendicular recording as described above. U.S. Pat. No. 5,073,836 and JP-A No. 62 (1993)-262213 disclose a configuration for disposing a read sensor between a main pole and a sub-pole or a configuration for disposing a read sensor in a multilayer magnetic material of the main pole. JP-A No. 2006-277834 discloses a magnetic head structure in which a ferromagnetic piece 24 referred to as a trailing shield is disposed closely to the main pole as shown in FIG. 17 to sharpen the recording magnetic field distribution at the trailing side of the main pole.

SUMMARY OF THE INVENTION

The perpendicular recording method as described above has also been confronted with a problem that the W-R distance increases in an aspect of the whole magnetic disk drive. In the single pole write sensor shown in FIG. 17, the main pole that generates a recording field is formed perpendicularly to the air bearing surface, that is, in parallel to the substrate surface. Consequently, as shown in FIG. 18, the distance between the write element 22 and the read element 11 increases generally more than the record element of longitudinal recording, in which the upper pole 27 is bent toward the read element 11. Consequently, the method is required to provide a wider reserved area in which no data is written adjacently to the servo data area of each recording track, thereby the total recording capacity of the subject magnetic disk drive is limited. In order to solve this problem, the patent documents 1 and 2 propose reduction of the space between the write element and the read element by disposing the read element near the main pole. In spite of this, if the read sensor consisting of magnetoresistive elements is disposed near the main pole in such a way, the magnetic field generated from the main pole comes to affect the free and pinned layers of the magnetoresistive film, thereby rotating the magnetizing directions and generating magnetic barriers. As a result, the reading property of the magnetoresistive element is degraded. This has been a problem.

Furthermore, the distance between the write element and the read element is an important size for determining the recording performance of the magnetic disk drive with respect to both perpendicular recording and longitudinal recording. An increase of the distance will also cause the write element throat height to be varied more in the air bearing surface process. This is because a pattern for detecting the terminal position of the air bearing surface processing is formed in the same layer as that of the read element. As a result, the head yield is lowered, thereby increasing the manufacturing cost.

In an aspect of the head manufacturing cost, in the configuration in which the trailing shield is disposed near the main pole as disclosed in JP-A No. 2006-277834, the effect of the trailing shield depends strongly on the thickness of the trailing shield and the distance between the main pole and the trailing shield. Thus the configuration requires an additional manufacturing process to determine those items accurately. And the configuration also comes to require a processing accuracy much higher than the conventional one even for the smoothing method, etc. that use the CMP (Chemical Mechanical Polishing) technique other than the ordinary depositing and lithographic techniques. And this is why the manufacturing processes become complicated and the number of processes increases unavoidably to meet such requirements.

Under such circumstances, it is an object of the present invention to provide a magnetic head capable of reducing the distance between the write element and the read element without degrading the writing and reading performance.

It is another object of the present invention to provide a magnetic disk drive having a storage capacity to meet high density recording requirements.

In order to achieve the above objects, the magnetic head of the present invention includes a main pole, a coil for exciting the main pole, a trailing shield disposed at the trailing side of the main pole, and a read sensor. The read sensor is disposed between the main pole and the trailing shield.

Side shields should preferably be disposed at both sides of the main pole and the read sensor in the track width direction.

The read sensor should preferably include a giant magnetoresistive film that includes at least two ferromagnetic metal films and a nonmagnetic metal film formed between those two metal films or a tunneling magnetoresistive film that includes at least two ferromagnetic metal layers and a high resistance nonmagnetic layer formed between those two metal layers.

Consequently, the magnetic head can reduce the W-R gap (distance between the write element and the read element) significantly, for example, up to a few nm from the conventional value of 5 to 10 μm and omit read track width processing and read shield forming processes without degrading the writing and reading performance.

In order to achieve another object described above, the magnetic disk drive of the present invention includes a perpendicular magnetic recording medium and a magnetic head. The magnetic head includes a main pole, a coil for exciting the main pole, a trailing shield disposed at the trailing side of the main pole, and a read sensor disposed between the main pole and the trailing shield.

The magnetic disk drive configured in such a way can realize a storage capacity appropriately to high density recording without degrading the recording format efficiency.

According to the present invention, therefore, it is possible to reduce the W-R gap between the read element and the write element in the high density recording magnetic head without degrading the reading and writing performance.

Furthermore, according to the present invention, it is possible to realize a storage capacity appropriately to high density recording in the magnetic disk drive.

DETAILED DESCRIPTION OF THE PREFERRED EMBODIMENTS

Hereunder, there will be described in detail a perpendicular recording magnetic head (hereinafter, to be referred to as a magnetic head) and a magnetic disk drive in an embodiment of the present invention with reference to the accompanying drawings.

Figure 1:
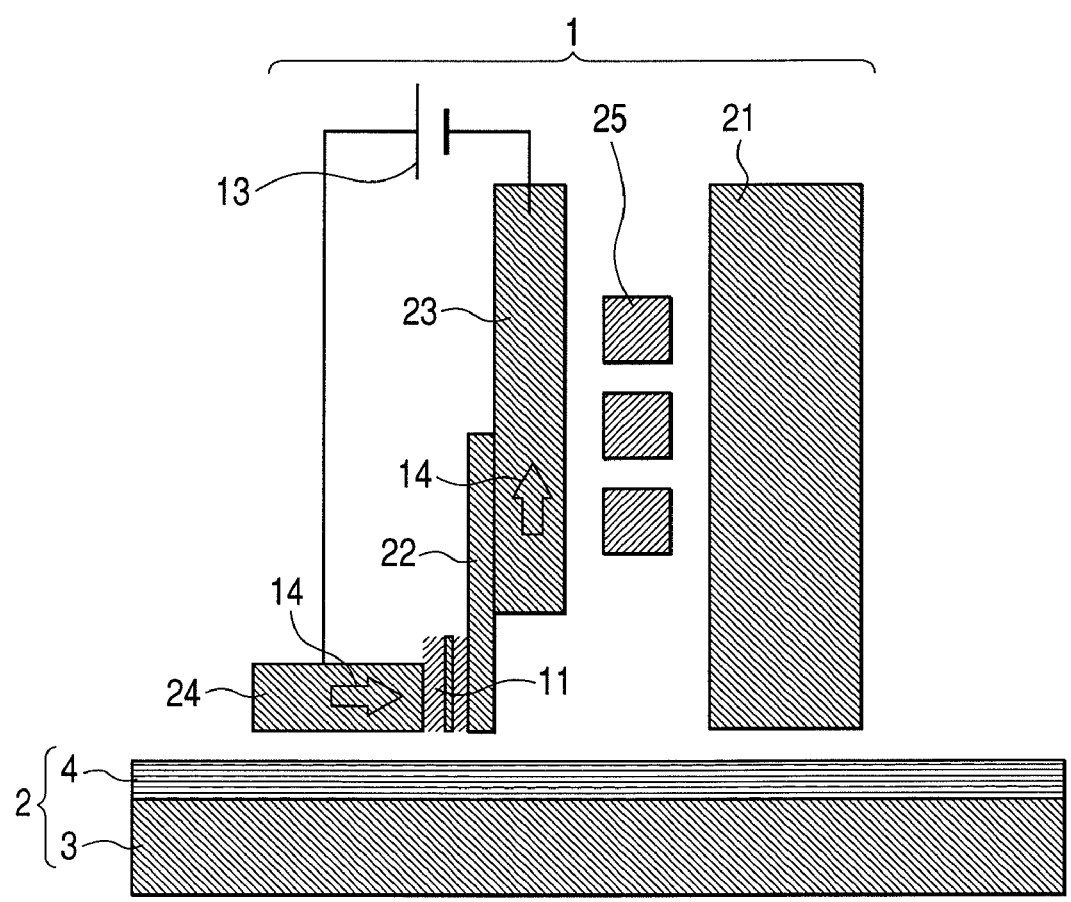
FIG. 1 is a cross sectional view of a magnetic head in an embodiment of the present invention.

FIG. 1 shows a cross sectional view of a magnetic head 1. A main pole 22 and a yoke 23, as well as a sub-pole 21, a soft medium magnetic under layer 3 of a magnetic recording medium (hereinafter, to be referred to as a magnetic disk) 2 are combined to configure a magnetic circuit. An exciting coil (hereinafter, to be referred to as a coil) 25 magnetizes the magnetic circuit to apply a recording magnetic field to a recording layer 4, thereby information bits are recorded in the layer 4. A trailing shield 24 formed with a ferromagnetic material is disposed at the trailing side of the main pole 22 adjacently to sharpen the magnetic field distribution generated by the main pole 22. And a read sensor (magnetoresistive element) 11 is provided between the trailing shield 24 and the main pole 22. The read sensor 11 reads bit information. The trailing shield 24 and the main pole 22 are connected to a current source or voltage source 12 respectively. The current or voltage source 12 supplies a sensing current 14 to the magnetoresistive element 11 during a read operation. The sensing current 14 flows actually in a direction perpendicular to the surface of a multi-layer film configuring the magnetoresistive element 11.

Figure 2:
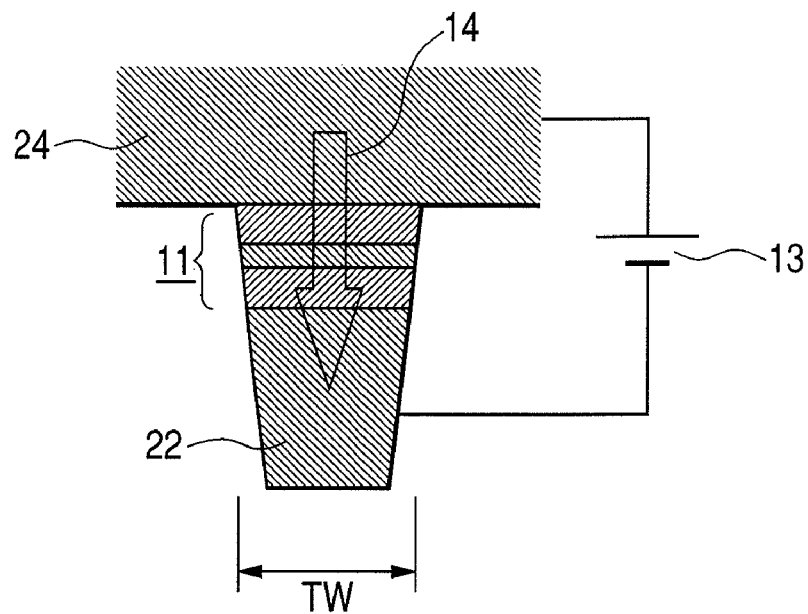
FIG. 2 shows an area around a magnetoresistive element of the magnetic head shown in FIG. 1, viewing from ABS.

FIG. 2 shows an area around the magnetoresistive element 11 viewing from the air bearing surface (ABS). The main pole 22 and the magnetoresistive element 11 are continued at both side faces in the track width (TW) direction. The main pole 22 and the element 11 are processed so as to be fit almost in the track width (TW). The track width (TW) is 100 nm or under. The side faces like this can be formed with a method that deposits a main pole film, a magnetoresistive film, etc. continuously and process those films in one etching process. This method can eliminate the processings of the track width of the read element and the track width of the write element separately, thereby the number of related processes is reduced.

The magnetoresistive element 11 should preferably include a CPP giant magnetoresistive film consisting of at least two ferromagnetic metal films and a nonmagnetic metal film formed between those two films or a tunneling magnetoresistive film consisting of at least two ferromagnetic metal films and a nonmagnetic high resistance film formed between those two films. In addition, the magnetoresistive element 11 includes an antiferromagnetic film that functions to set a proper bias that makes the above two types of magnetoresistive films response linearly to the magnetic field from the medium, as well as a metal film that can keep an electric contact among the magnetoresistive film, the main pole 22, and the trailing shield 24.

Figure 3:
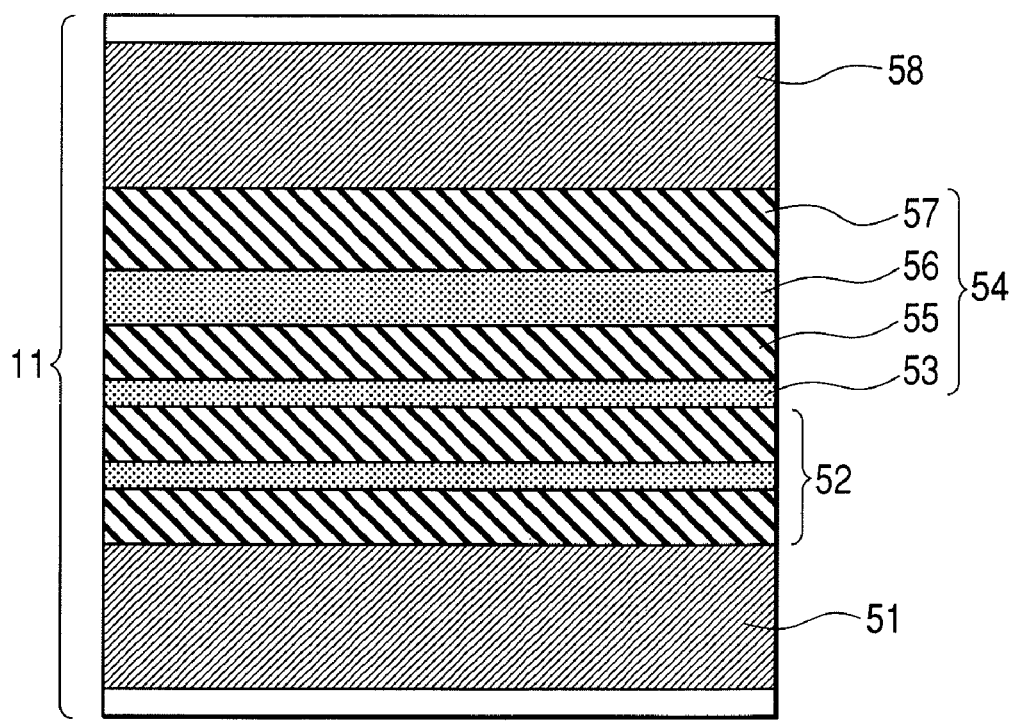
FIG. 3 shows a configuration of a layer of the magnetoresistive element.
Figure 4:
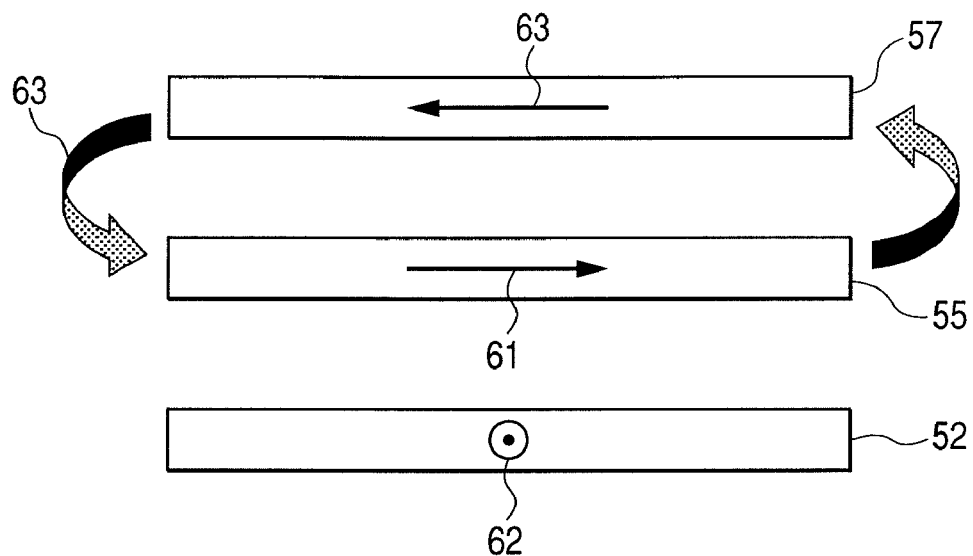
FIG. 4 is an explanatory diagram for showing magnetizing directions of the magnetoresistive element shown in FIG. 3.

FIG. 3 shows an example of a configuration of the magnetoresistive element 11. The magnetoresistive element 11 is formed by stacking a free layer consisting of an antiferromagnetic layer 51, a pinned layer 52, a nonmagnetic layer 53, a first ferromagnetic layer 55, an Ru layer 56, and a second ferromagnetic layer 57, as well as an antiferromagnetic layer (hereinafter, to be referred to as a bias layer) 58. The pinned layer 52 is formed by stacking two ferromagnetic layers through a Ru layer. FIG. 4 shows magnetizing directions of the pinned layer 52 and the free layer 54. The magnetizing direction of the pinned layer 52 is fixed in a direction 62 perpendicular to the track width direction due to a magnetic field of exchange coupling with the ferromagnetic layer 51. The first and second ferromagnetic layers 55 and 57 are coupled by the Ru layer 56 antiferromagnetically. The second ferromagnetic layer 57 is magnetized in the track width direction 63 due to a magnetic field of exchange coupling with the bias layer 58. The first ferromagnetic layer 55 is magnetized in a direction 61 antiparallely to the magnetizing direction 63 of the second ferromagnetic layer 57. The output of the magnetoresistive element 11 changes due to an angle formed by the magnetization direction 62 of the pinned layer 52 and the magnetization direction 61 of the first ferromagnetic layer 55. If the magnetoresistive element 11 shown in FIG. 3 is formed as a CPP giant magnetoresistive film, the non-magnetic layer 53 is a nonmagnetic metal film (Cu or the like). If the magnetoresistive element 11 is formed as a tunneling magnetoresistive film, the nonmagnetic layer 53 is a nonmagnetic high resistance ($Al_2O_3$ or the like).

According to the structure of the magnetic head in this embodiment, the magnetic flux generated in the main pole 22 flows mainly into the soft magnetic under layer 3 and returns to the trailing shield 24. Thus the magnetic flux flowing into the magnetoresistive element 11 is negligibly small. Consequently, the magnetoresistive element 11 does not affect any of the magnetizing direction 62 of the pinned layer 52 and the magnetizing direction of the free layer 54 practically. This is why the distance between the main pole 22 and the magnetoresistive element 11 can be reduced without degradation in the read property of the magnetoresistive element 11.

Figure 5:
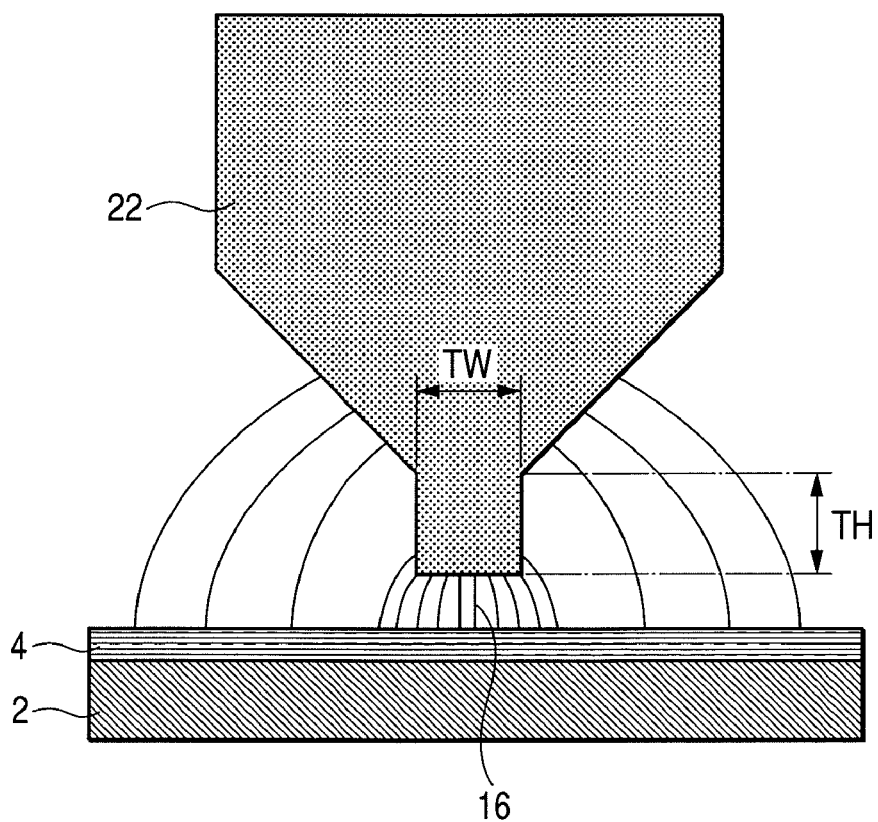
FIG. 5 shows a throat height of a main pole.
Figure 6A:
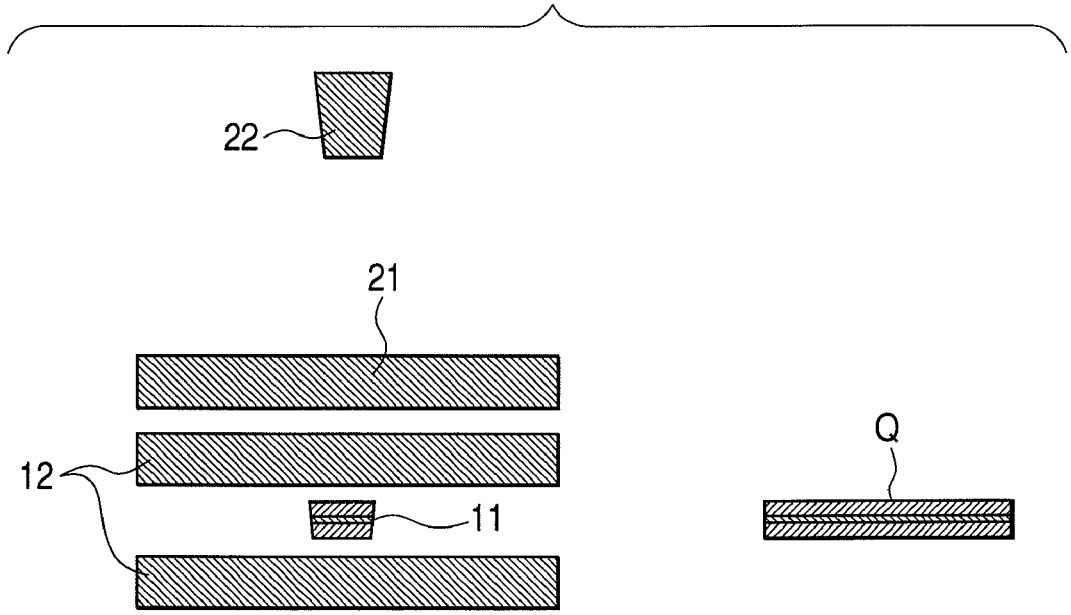
FIG. 6 shows a relationship between the main pole and a polishing terminal position detecting pattern.
Figure 6B:
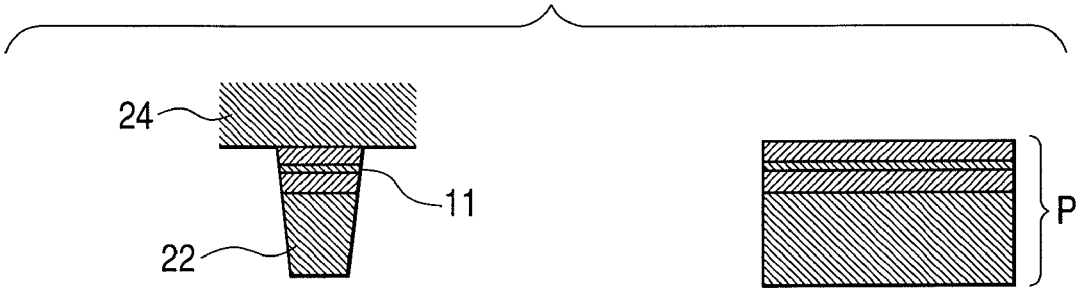

The reduction of the distance between the main pole 22 and the magnetoresistive element 11 makes it possible to use the same polishing terminal point detection pattern to process the throat height (about 50 nm) of the main pole 22 that is an important size to determine recording performance and the sensor height (about 100 nm) of the magnetoresistive element 11 for determining reading performance accurately. FIG. 5 shows the throat height (TH) of the main pole 22 viewing from the trailing side. FIG. 6A shows a polishing terminal position detecting pattern Q in a process of the conventional magnetic head air bearing surface polishing, viewing from the air bearing surface side. The pattern Q is formed on the same layer as that of the magnetoresistive element 11 upon deposition of the magnetoresistive element 11. This is because the magnetoresistive element 11 is formed finely and its sensor height is determined very accurately. If the distance between the magnetoresistive element 11 and the main pole 22 is long, however, it is difficult to define the throat height (TH) of the main pole 22 accurately. FIG. 6B shows a polishing terminal position detecting pattern P in an air bearing surface polishing process of the magnetic head 1 in this embodiment. And because the main pole 22 and the magnetoresistive element 11 are deposited consecutively, the polishing terminal position detecting pattern P formed simultaneously with those films can be used for detecting the polishing terminal positions of the magnetoresistive element 11 and the main pole 22. Consequently, the pattern P can be used to process both the sensor height (SH) and the throat height (TH) very accurately.

Because the magnetoresistive element 11 functions as a shield read sensor between ferromagnetic elements (the main pole 22 and the trailing shield 24), the use of the magnetoresistive element 11 can omit the upper and lower magnetic shields 12 dedicated to the read sensor, although those shields 12 are required for the conventional perpendicular recording thin film magnetic head shown in FIG. 1. This is why the number of manufacturing processes can be reduced in this embodiment.

Furthermore, as described above, the main pole 22 and the magnetoresistive element 11 are formed by depositing the main pole film, the magnetoresistive film, etc. consecutively and process those films in one etching process into almost the same track width (TW). As a result, the track widths of the read and write elements are not required to be processed separately. The number of related processes can thus be reduced.

Figure 7:
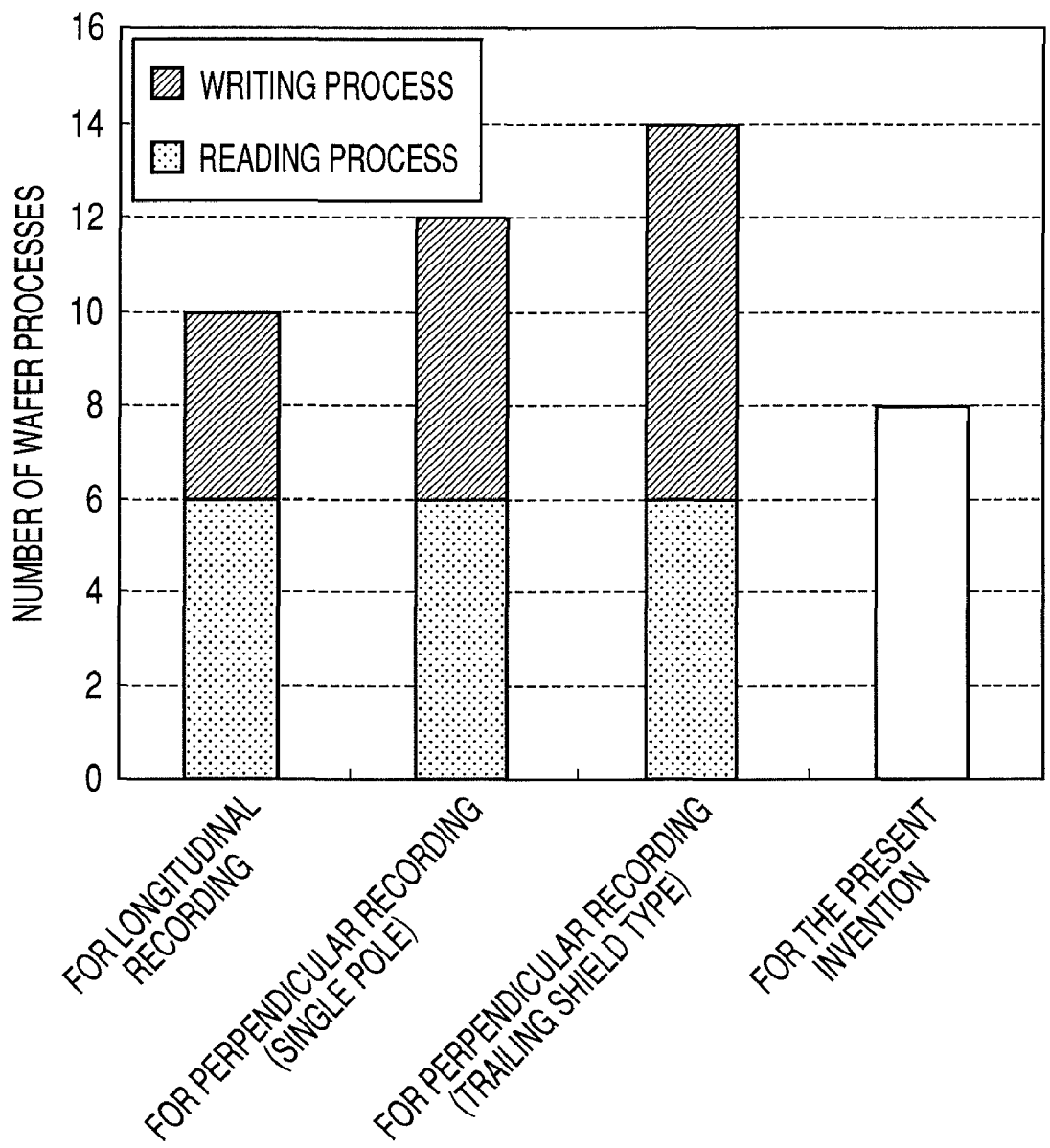
FIG. 7 shows the number of wafer processes.

FIG. 7 shows a graph for making a comparison among a longitudinal recording thin film magnetic head, a single pole perpendicular recording thin film magnetic head according to a conventional technique, a perpendicular recording thin film magnetic head provided with a trailing shield with respect to the number of processes during a wafer process of the magnetic head 1 in the above embodiment. In order to boost area recording density, the head structure has been complicated more and more and the number of processes has also been increasing apparently to meet the requirement of such a head structure. On the contrary, the magnetic head 1 in this embodiment can reduce the number of processes more than the longitudinal recording thin film magnetic head. And the number of processes can be reduced almost to a half of that of the perpendicular recording thin film magnetic head provided with a trailing shield according to the conventional technique. Consequently, the manufacturing cost can be reduced significantly while keeping high writing and reading performance.

Figure 8A:
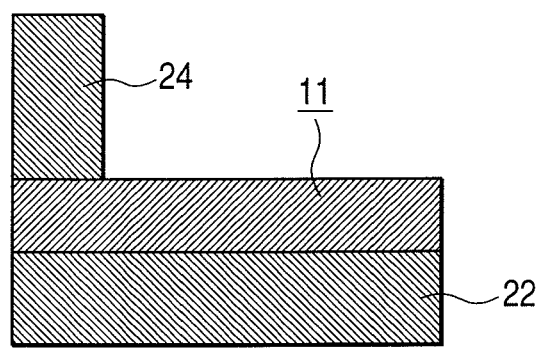
FIG. 8 shows a method for determining an element height of the magnetoresistive element.
Figure 8B:
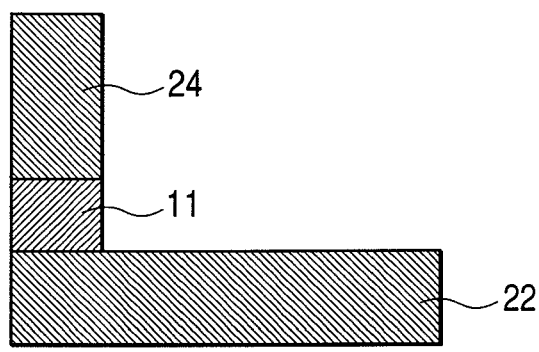
Figure 8C:
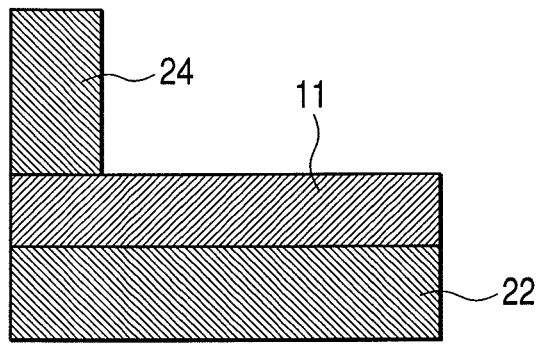

Next, there will be described a method for determining a height of the magnetoresistive element 11 disposed between the main pole 22 and the trailing shield 24 with reference to FIG. 8. In FIG. 8A, no special process is applied to the height of the magnetoresistive element 11 in the above embodiment. However, because the distribution of the sensing current in the depth direction is limited by the depth of the trailing shield 24 to which a sensing current is supplied, the read output sensibility is hardly lowered by a shunt of the sensing current to an area to which the flux from the medium never enters. FIG. 8B shows an example in which the height of the magnetoresistive element 11 is dry-etched so as to be aligned to the height of the trailing shield 24. In this case, the element height is determined accurately, so that the read output sensitivity of the magnetoresistive element 11 is less varied. FIG.

Figure 8D:
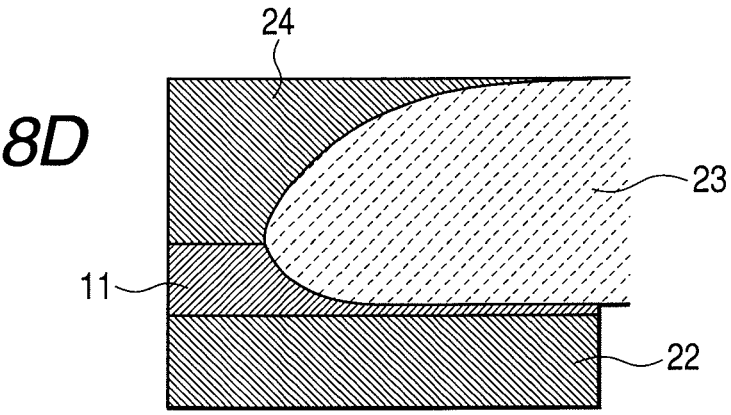

8C shows an example in which the element height is processed similarly to that in FIG. 8B, but the process is done so that the height is left over slightly around the main pole 22. In this case, the main pole 22 is never damaged in the etching process. In addition, the read output sensitivity is prevented from degrading just like in FIG. 8A. FIG. 8D shows an example, in which the element height is processed in a dry-etching process upon forming of the magnetoresistive element 11, thereby forming a resist 29. After this, the trailing shield 24 is formed in a process of plating or the like. In this case, it is possible to obtain both the effect in FIG. 8C and the effect in FIG. 8A.

Figure 9:
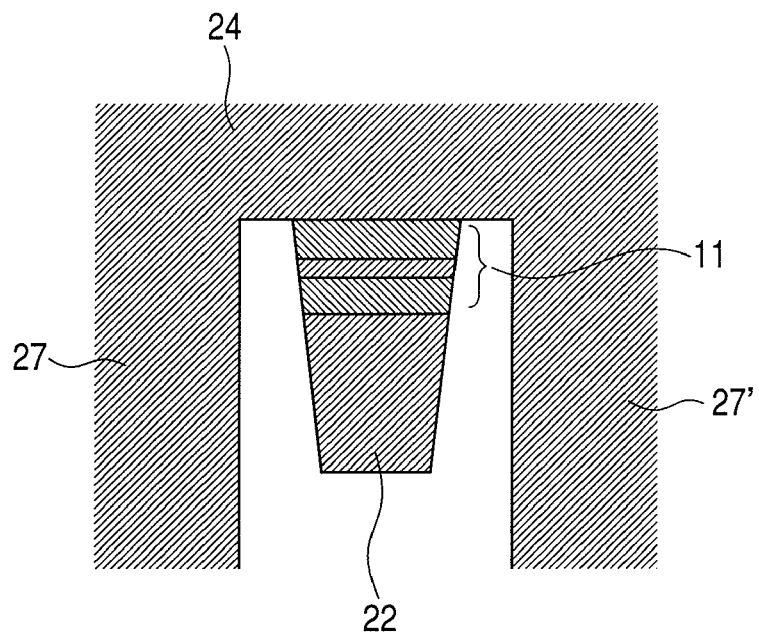
FIG. 9 shows how side shields are disposed at both sides of the main pole and the magnetoresistive element.
Figure 10:
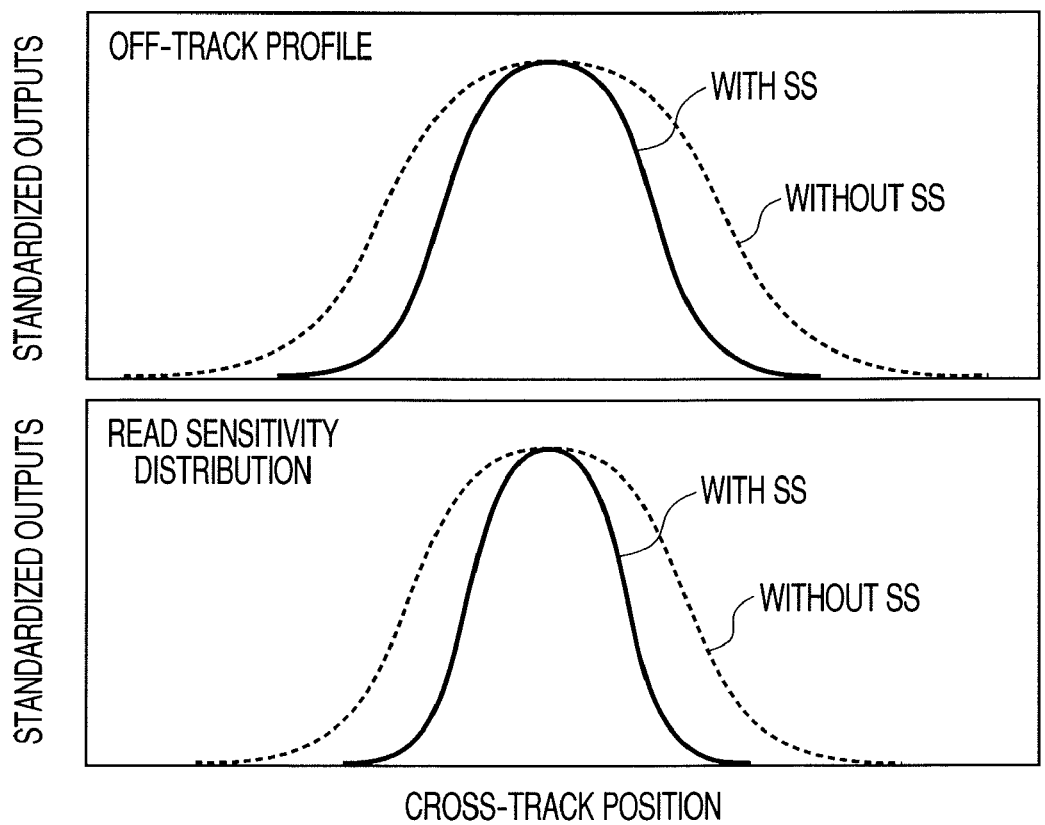
FIG. 10 shows effects of the side shields.

In the above embodiment, the magnetic head 1 is provided with the trailing shield 24. However, as shown in FIG. 9, side shields 27 and 27' may also be disposed at both sides of the main pole 22 and the magnetoresistive element 11. This configuration, as shown in FIG. 10, can reduce the spread (side writing) of the off-track profile at the time of writing and the spread (side reading) of the read sensitivity at the time of reading.

Figure 11:
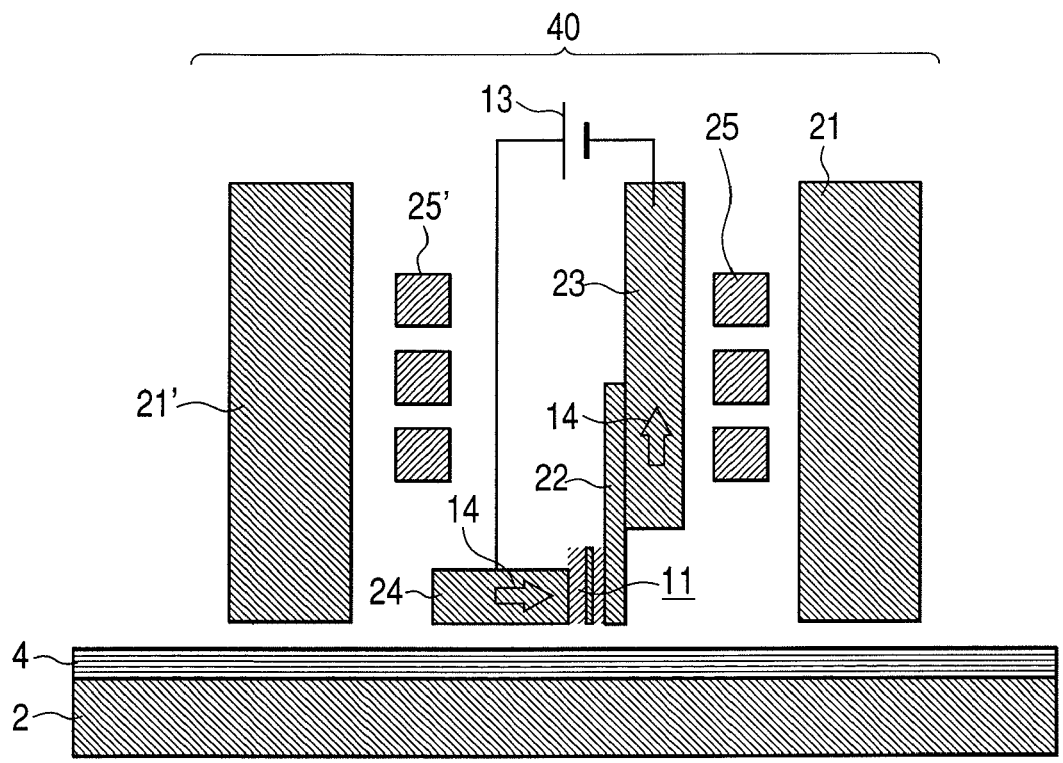
FIG. 11 shows a variation of the magnetic head shown in FIG. 1.

Also in the above embodiment, a sub-pole 21 and a coil 25 are provided at the trailing side of the main pole 22. However, as shown in FIG. 11, a second sub-pole 21' and a second coil 25' may also be disposed at the trailing side of the main pole 22. This configuration can increase the recording magnetic field generated by the main pole 22, thereby reducing the influence of the return magnetic flux.

Figure 12:
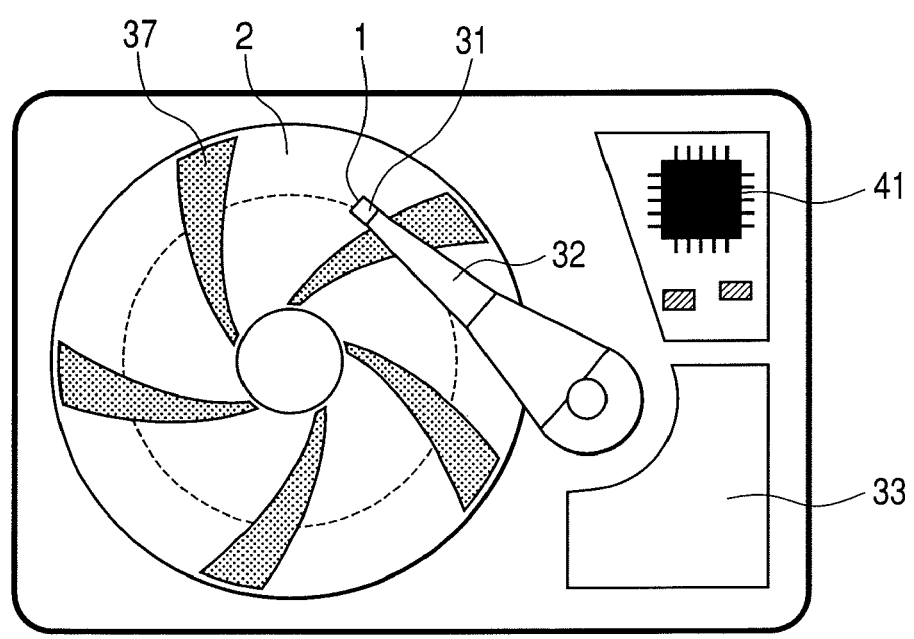
FIG. 12 is a top view of a magnetic disk drive having the magnetic head in the embodiment of the present invention.
Figure 13:
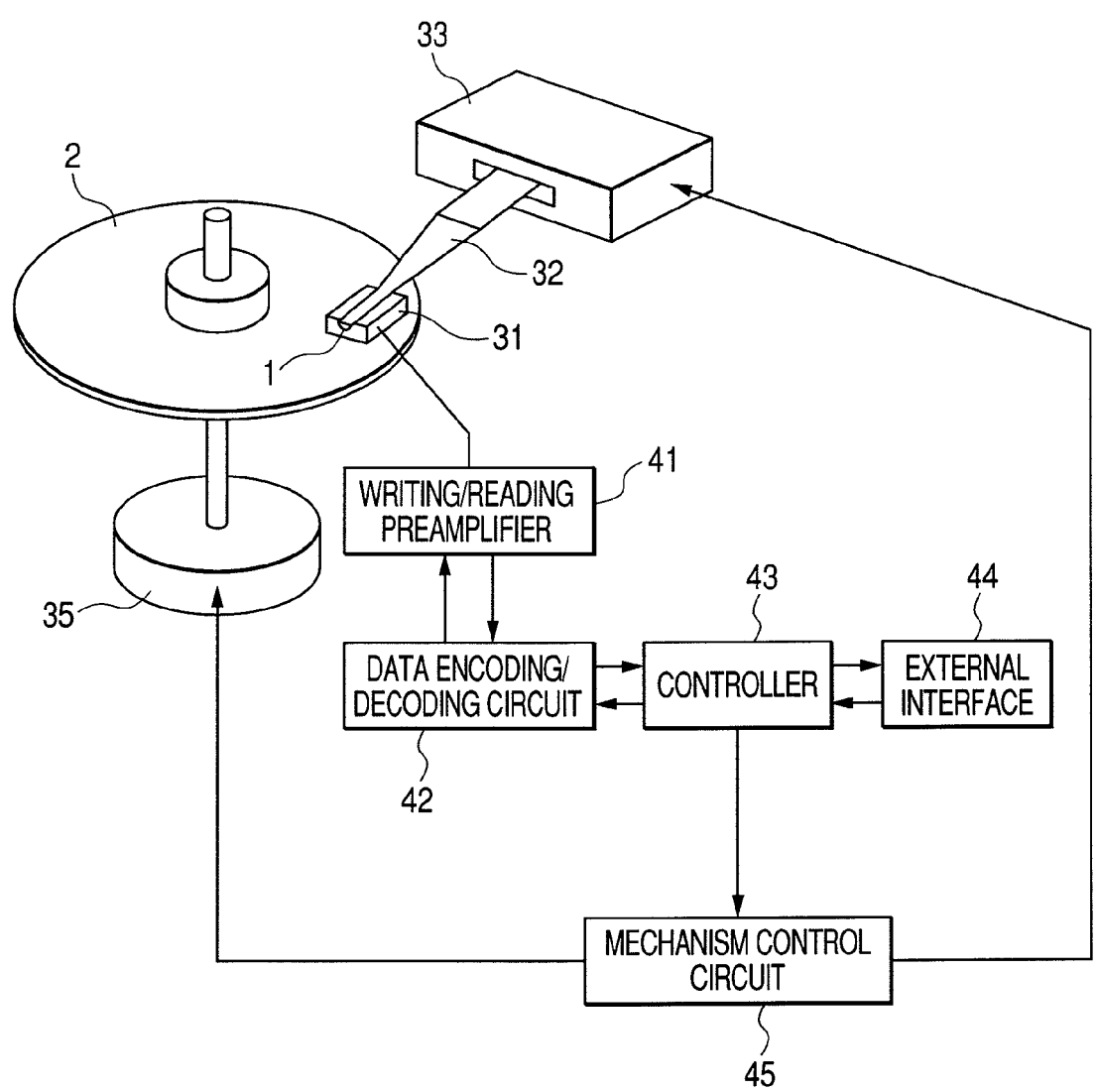
FIG. 13 is a block diagram of a configuration of the magnetic disk drive having a control system in the embodiment of the present invention.

Next, there will be described a magnetic disk drive provided with the magnetic head described in the above embodiment. FIG. 12 shows a top view of the magnetic disk drive and FIG. 13 shows a block diagram of a configuration of the drive including a control system. A slider 31 having the magnetic head 1 is supported by a suspension arm 32 and positioned by an actuator 33 on a desired track on a magnetic disk 2. A spindle motor 35 generates the rotation of the magnetic disk 2. Each servo area 37 on the magnetic disk 2 records a signal (servo signal) denoting a predetermined position and the magnetic head 1 reads the servo signal and a mechanism controller 45 processes the signal, then the processed signal is fed back to the actuator 33, thereby making closed loop controlling. User data inputted through an external interface 44 is encoded and shaped by a controller 43 and a data encoding/decoding circuit 42 with a method preferred to the magnetic recording system, then converted to a recording current waveform by a writing/reading IC 41. This current excites a write pole, thereby bits are written in the user data area on the magnetic disk 2. On the other hand, a leak magnetic field from written bits is sensed by the read sensor of the magnetic head 1, thereby the magnetic field is converted to an electrical signal and subjected to wave equalizing and decoding processings in the writing/reading IC 41 and in the data encoding/decoding circuit 42 according to a method preferred to the magnetic recording system, thereby reproducing user data. The clock signal for giving a timing of polarity inversion in the recording current is generated independently in the controller 43 or in its peripheral circuit and sent to the writing/reading IC 41.

Figure 14:
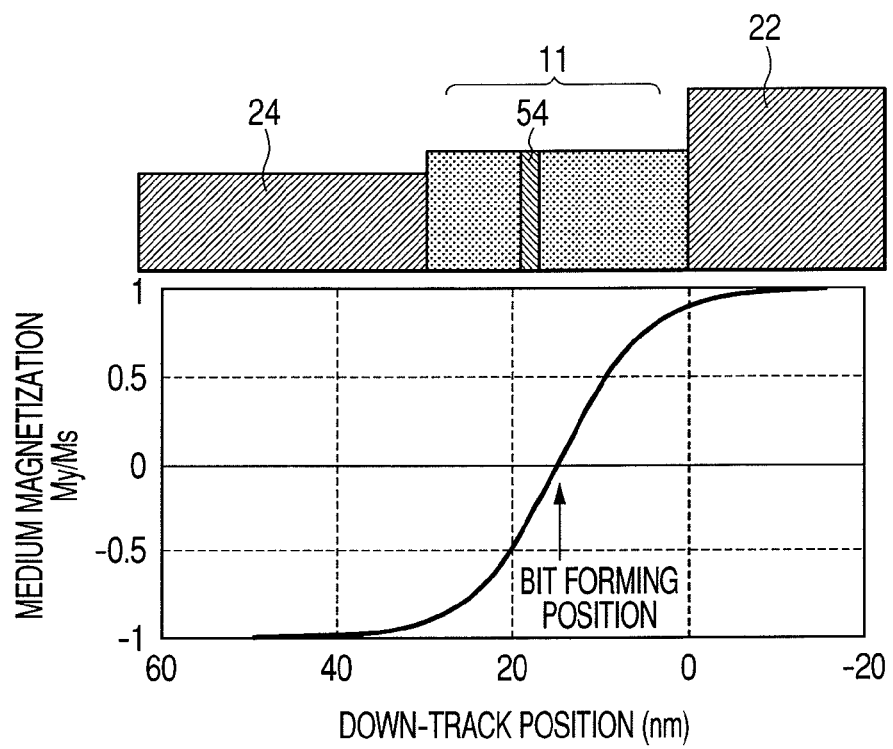
FIG. 14 shows a relationship between a recording position and a reading position of the magnetic head in the embodiment of the present invention.

FIG. 14 shows how the magnetic head 1 records bit information actually on a magnetic disk. The coordinate origin 0 of the horizontal axis in the graph denotes a position just under the trailing side edge of the main pole 22. It is considered that the bit information is recorded at a position where the medium magnetization is changed from positive to negative. As shown in FIG. 14, the actually recorded position in a moment is shifted by a few 10 nm to the trailing side from the main pole trailing side edge. Consequently, it is possible to set the position of the free layer 54 in which the magnetization rotates in response to a medium magnetic field so that the actual writing and reading positions are almost put one upon another. The free layer 54 is included in the magnetoresistive element 11. At this time, the position of the free layer 54 is not necessarily in the center between the main pole 22 and the trailing shield 24; the position may be optimized in a proper range by taking consideration to the influence of the recording magnetic field, the performance of the magnetoresistive film, and the reading property.

Figure 15:
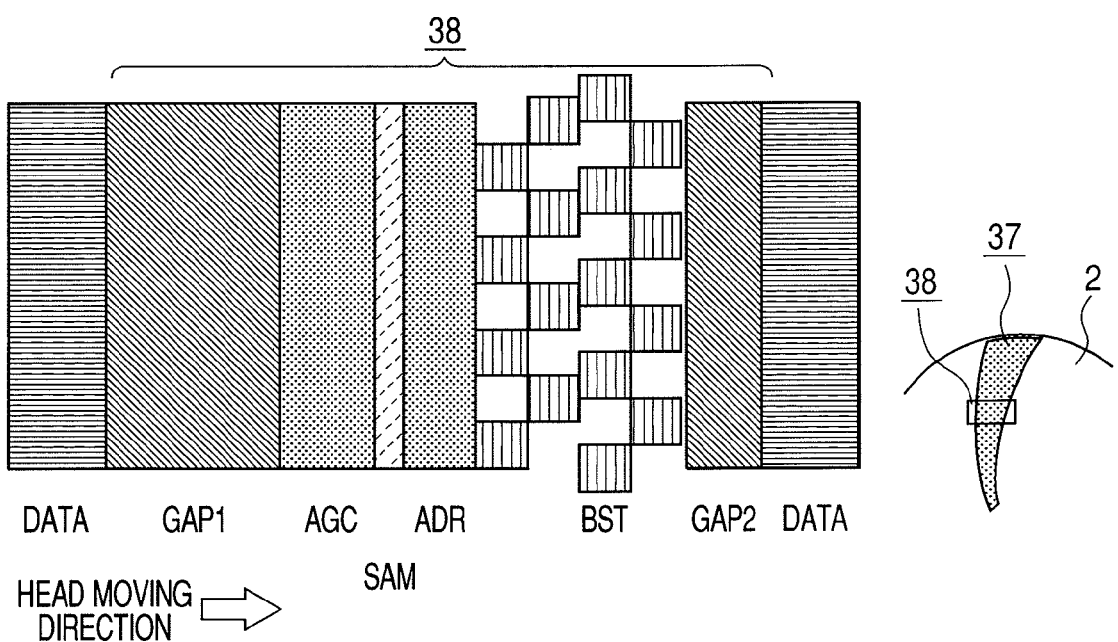
FIG. 15 shows a format of recording tracks on a magnetic disk.
Figure 16A:
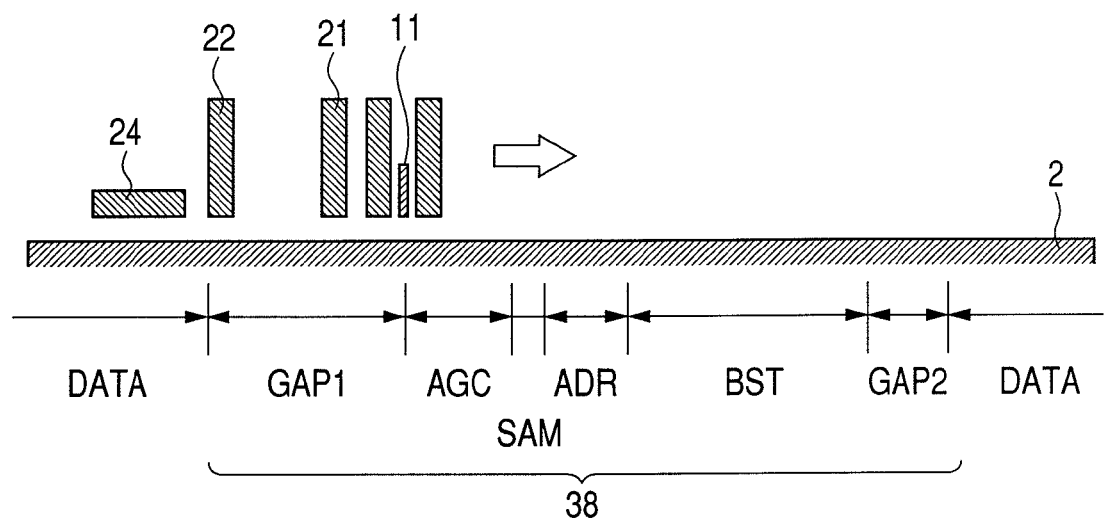
FIG. 16 is an explanatory top view of a magnetic recording medium of the present invention for describing the formatting efficiency.
Figure 16B:
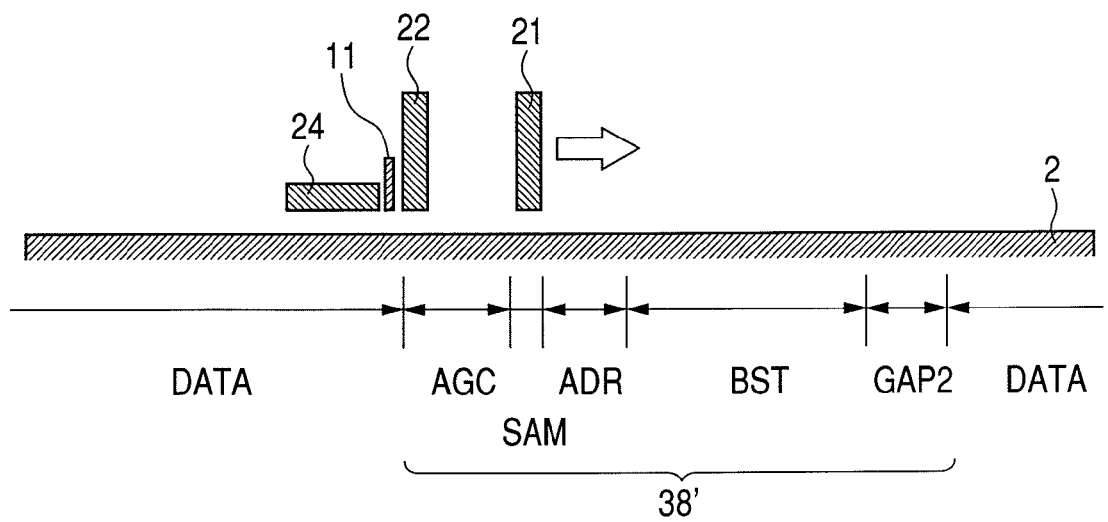
Figure 17:
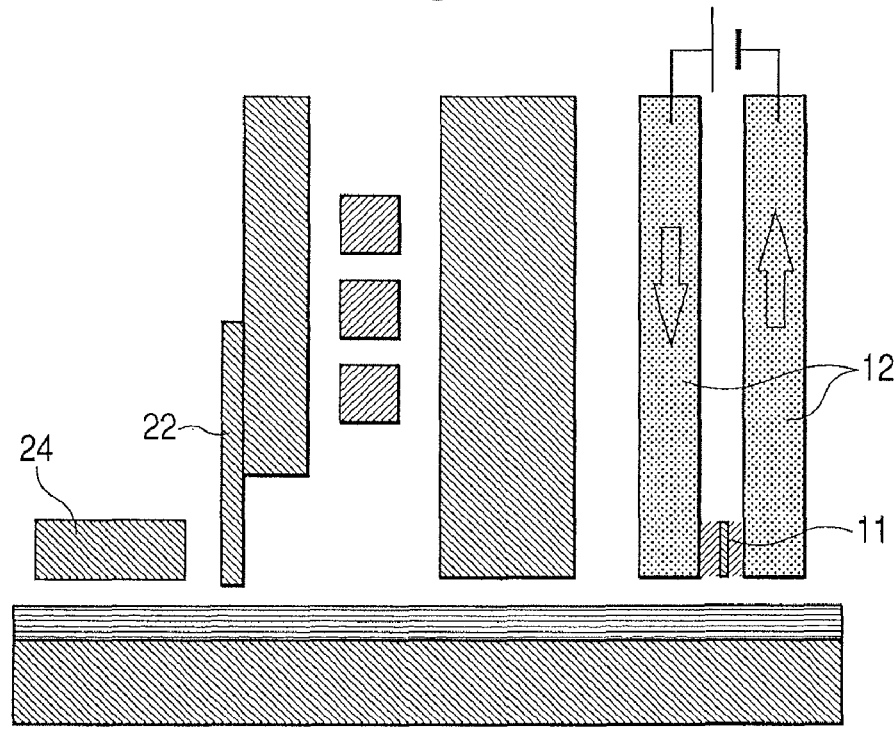
FIG. 17 is a cross sectional view of a perpendicular recording magnetic head provided with a conventional trailing shield.
Figure 18:
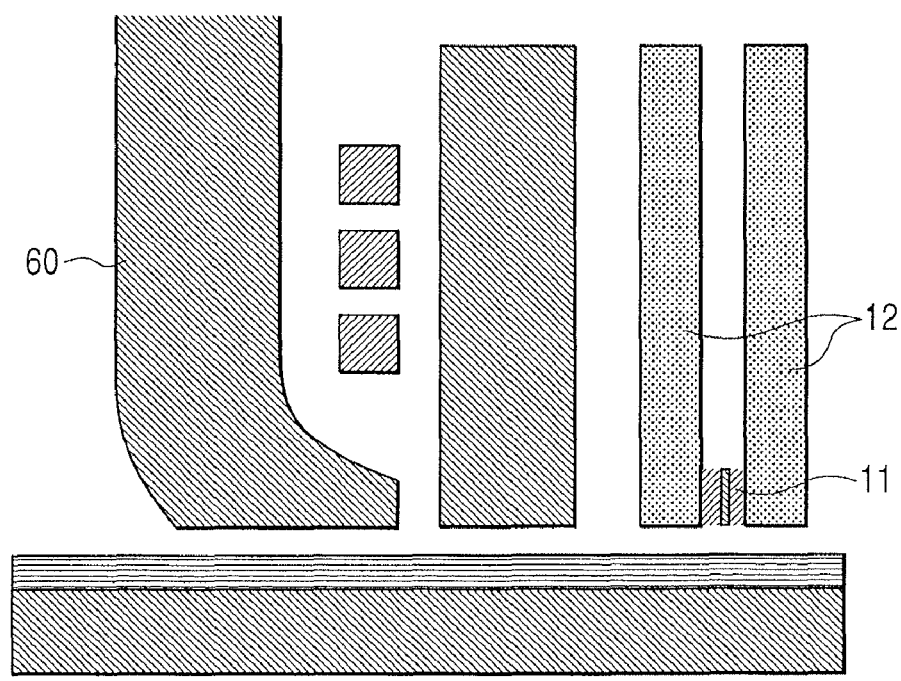
FIG. 18 is a cross sectional view of a conventional longitudinal recording magnetic head.

FIG. 15 shows a format of the recording tracks of a conventional magnetic disk 34. A user data area (DATA) and a servo data area 38 are provided in each sector of each recording track. The servo data area 38 consists of a gap (GAP) 1, a servo AGC (AGC), a servo mark (SAM), an address part (ADR), a burst signal (BST), and a gap (GAP) 2. This track format is assumed for both writing and reading by the conventional magnetic head as shown in FIG. 16A. And because the space between the main pole 22 and the magnetoresistive element 11 is wide, the GAP 1 is required so as to follow the user data area. In the case of the magnetic head 10 in the above embodiment, however, because the main pole 22 and the magnetoresistive element 11 are disposed very closely to each other, the servo data area 38' does not require the GAP 1. As a result of the very close disposition of the writing and reading positions in such a way, the GAP 1 (reserved area) is hardly required, although it is required at the boundary between each user data area and each servo data area. Consequently, the formatting efficiency and the area recording density are improved, thereby the recording capacity of the magnetic disk drive increases more.

The writing/reading performance of this magnetic disk drive was checked and found that the practical bit error rate property was about $10^{-4}$ even at a very high linear recording density of 1.5 MBPI (MBPI: the number of bits per inch is $10^6$). As a result, a linear recording density 1.6 MBPI and a track density 320 kTPI (kTPI: the number of tracks per inch is $10^3$), that is, an area recording density of 512 Gb per square inch was realized. And because the head manufacturing cost can be suppressed and the formatting can be improved at the same time without degrading the high writing/reading performance as described above, the technique has been able to provide low price large capacity magnetic disk drives.

Fourth Embodiment

Figure 19:
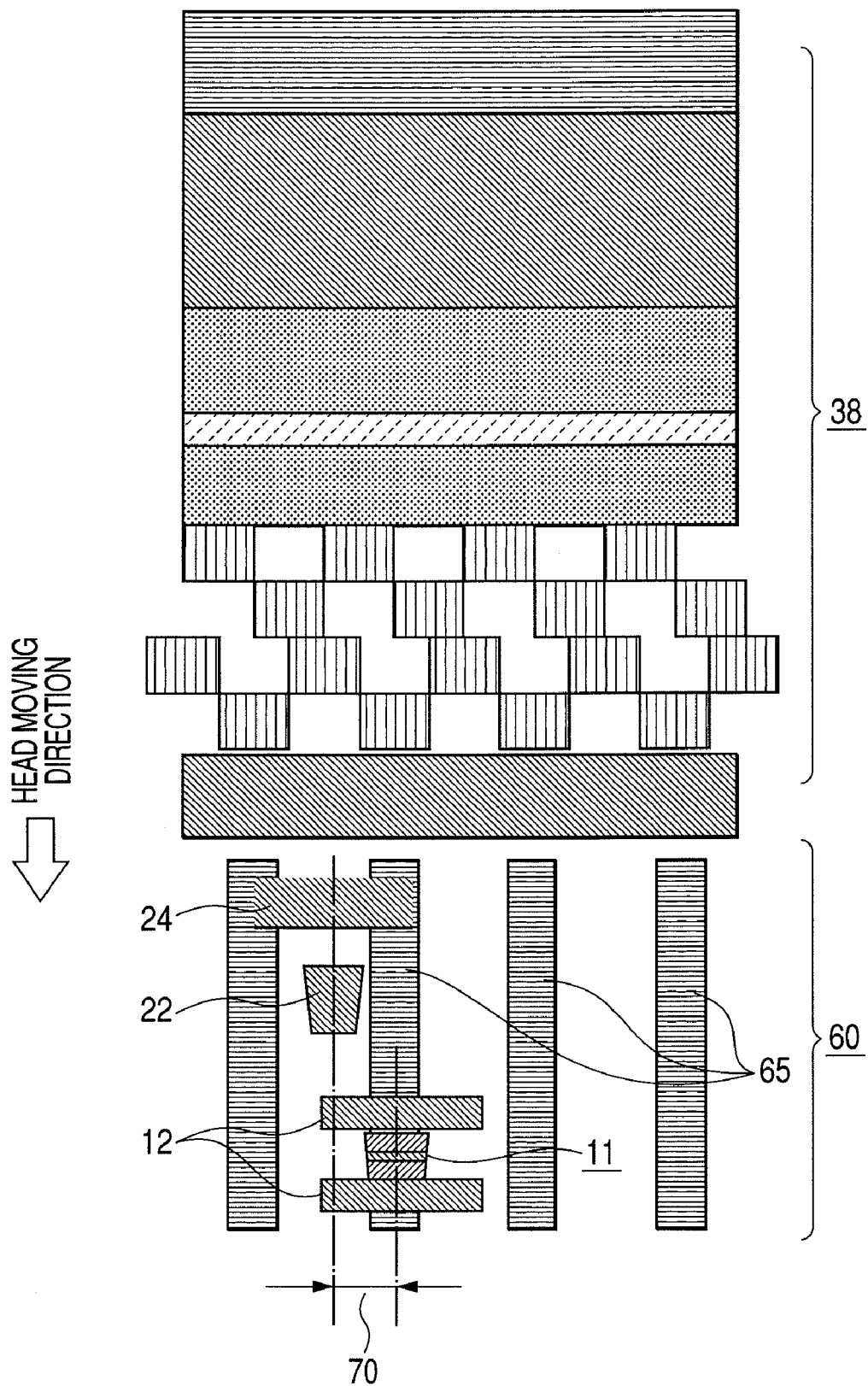
FIG. 19 is an explanatory view of a combination of a conventional trailing shield type perpendicular recording thin film magnetic head and a patterned medium.
Figure 20:
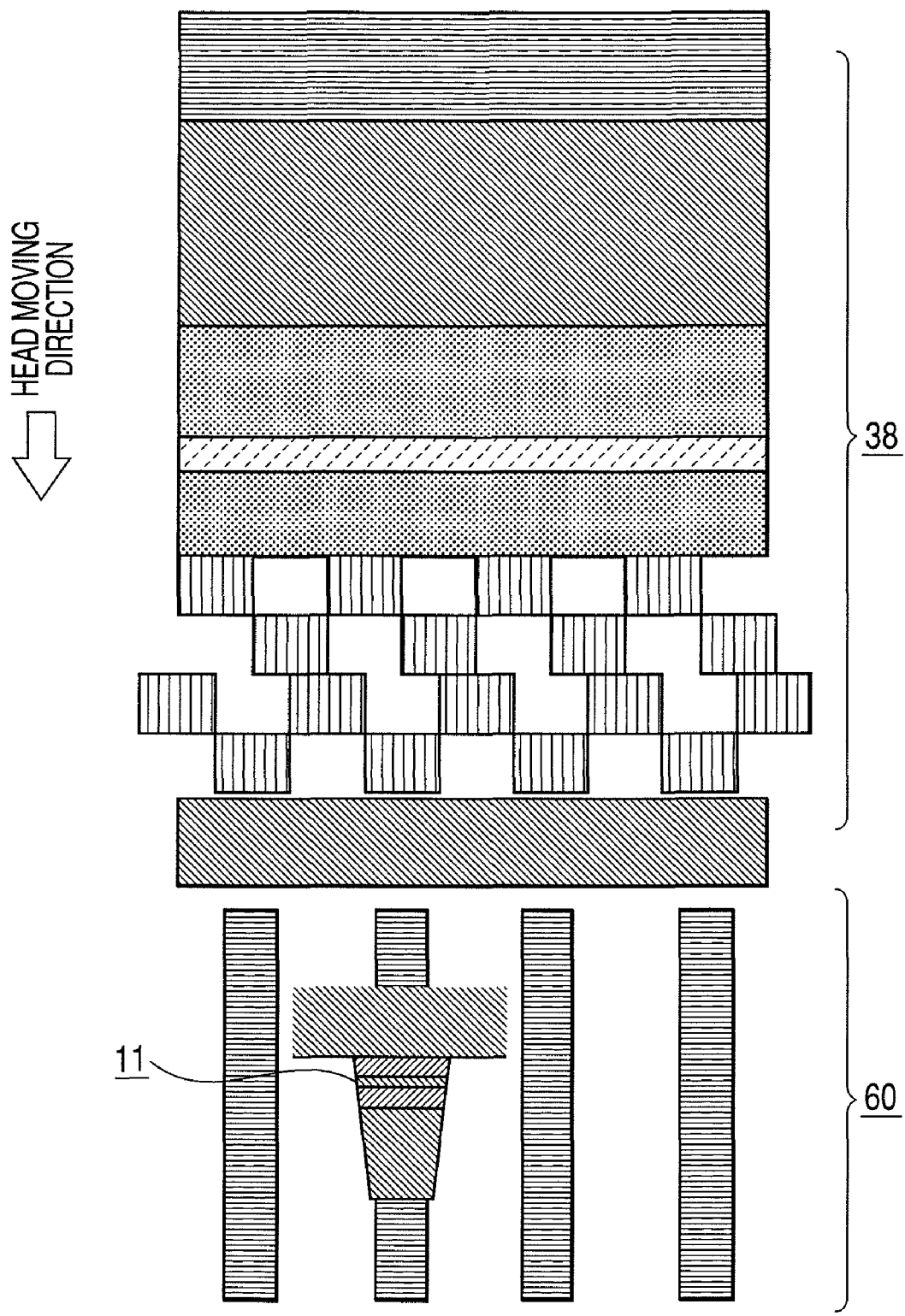
FIG. 20 is an explanatory view of a combination of a thin film magnetic head of the present invention and a pattern medium.

FIG. 19 shows an explanatory view of a head/medium portion in a magnetic disk drive in which a data part track 65 is discretized with a lithography process, etc. and the conventional magnetic head shown in FIG. 2 are combined. FIG. 19 also shows a state in which how a read sensor 11 positioned by reading a signal of a servo area 38 is reading information on a track. Generally, the writing main pole 22 is not positioned on any track at this time. This is because of the pattern positioning accuracy in the head manufacturing process. Consequently, in a write process, the head reads information while it is offset in the radial direction just by a distance equivalent to the already learned write-read offset value 70 so that the main pole 22 is positioned on the target track. This offset value differs among heads and is varied among radius positions. Thus learning such offset values in all the zones with respect to all the heads in all the disk drives has caused the disk drive assembly process to be complicated and the cost to be increased. FIG. 20 shows a case in which a similar pattern medium is combined with the magnetic head of the present invention. If the read sensor 11 is on a track, the main pole 22 is also positioned on a track automatically, so that the offset values learning process described above can be completely omitted. As a result, the disk drive assembly time and cost can be reduced significantly. And because it is not required to correct the write-read offset, the spare area to be provided between the servo area and the data area is minimized, thereby the positioning accuracy is improved. The pattern medium mentioned here is a so-called discrete track media for which only tracks are patterned. However, the effect to be obtained with use of such a pattern media is completely the same as that obtained with use of the so-called bit patterned media for which bit positions are also patterned beforehand. Furthermore, it is also possible to reduce the manufacturing process time and cost, increase the storage capacity, and improve the head positioning accuracy significantly by applying the magnetic head of the present invention to non-patterned media in any magnetic disk drives employing a track pitch that differs between the servo signal and the data portion.

Fifth Embodiment

Figure 21:
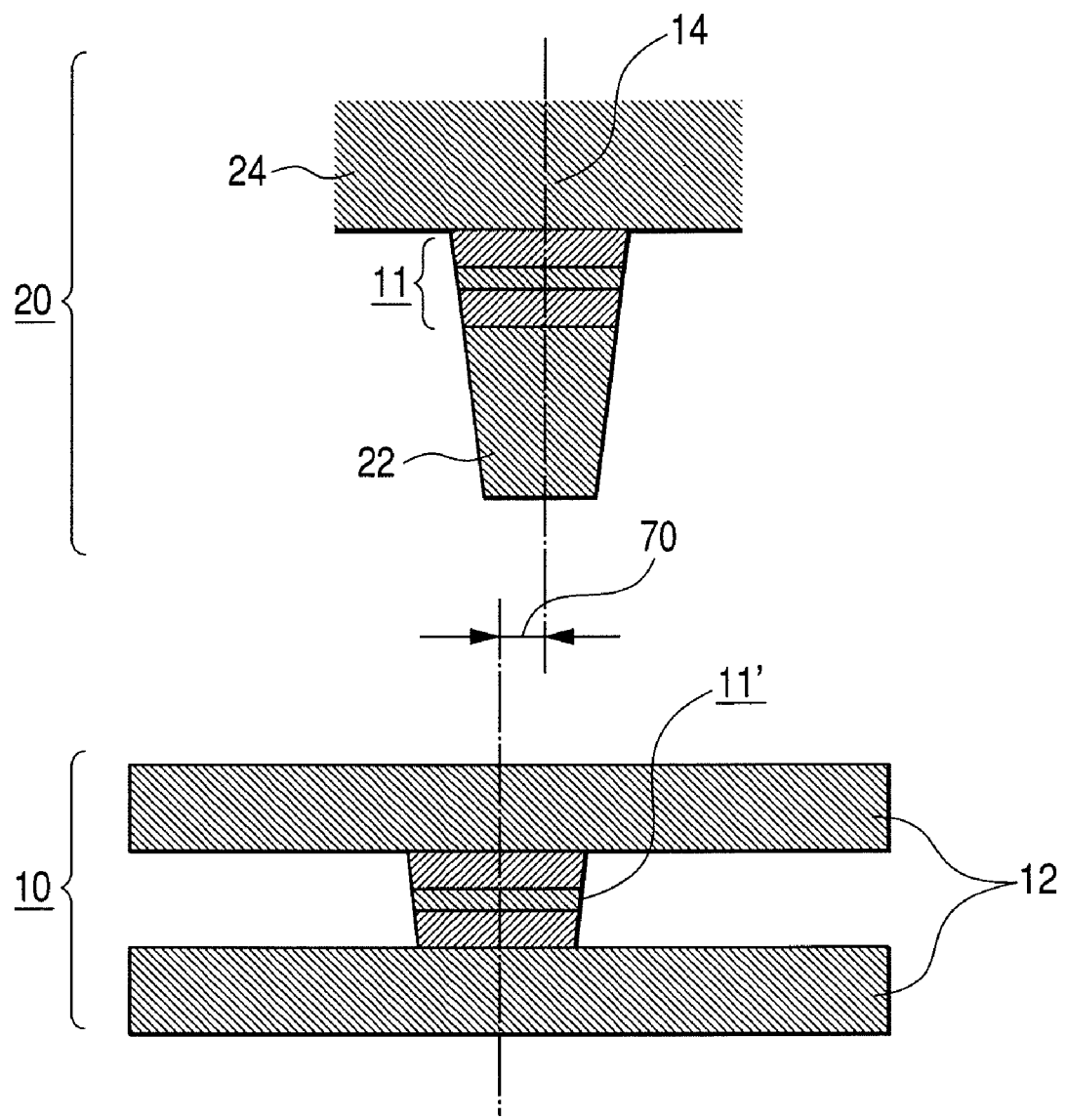
FIG. 21 is an explanatory view of a head formed by combining the thin film magnetic head of the present invention and a read-only sensor from the air bearing surface.
Figure 22:
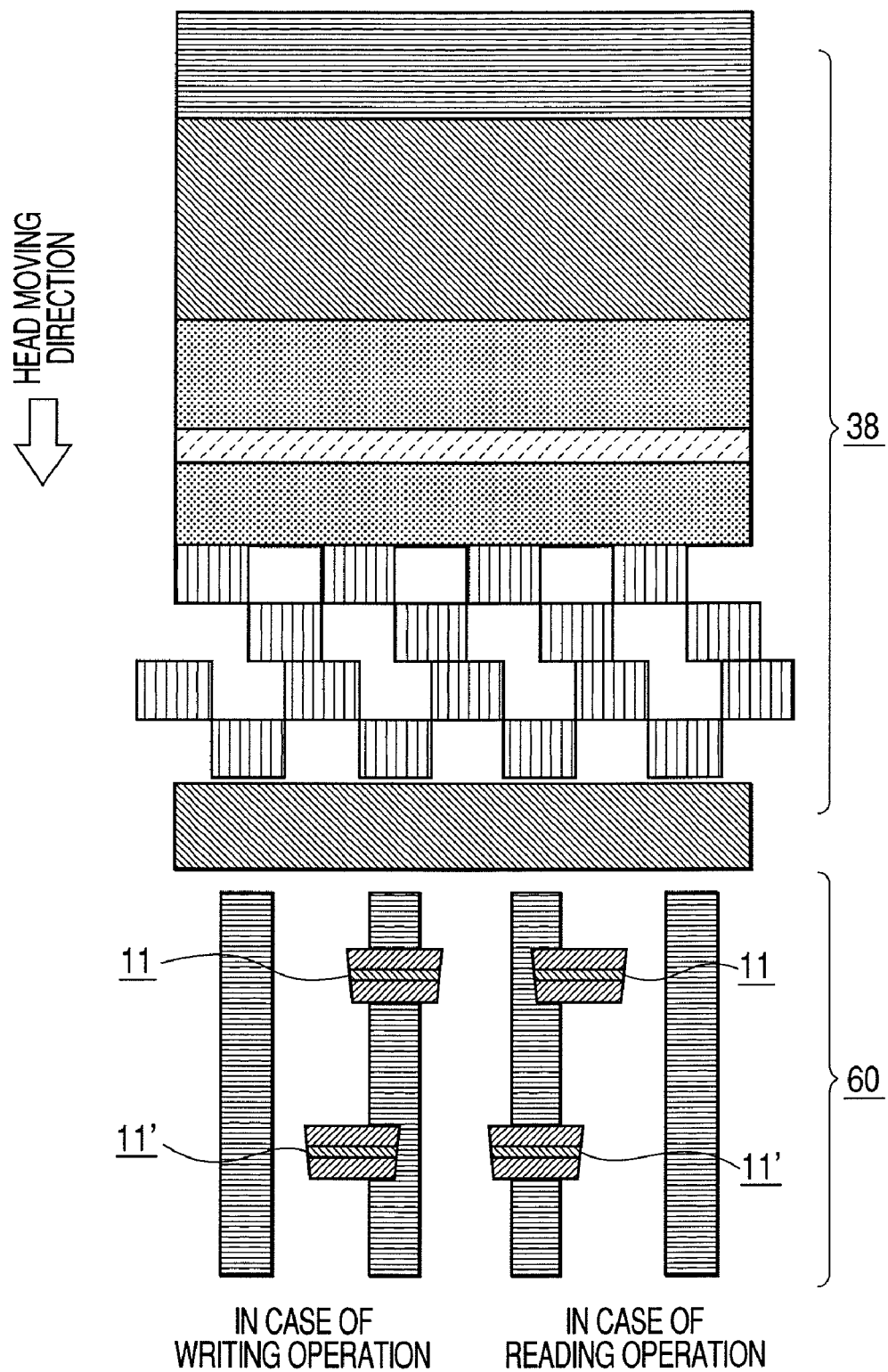
FIG. 22 is an explanatory view of a combination of the head shown in FIG. 21 and a pattern medium.

In some cases, required specifications differ between the data read sensor and the servo signal reading. It is an object of the present invention to provide a magnetic head and a magnetic disk drive for coping with such cases. FIG. 21 shows an explanatory view of a thin film magnetic head from the air bearing surface. The head is composed of a magnetic head manufactured according to the present invention and a read-only sensor 11'. Generally, the in-gap read sensor 11 can differ from the read-only sensor 11' in element width and sensitivity. Also in this case, an offset 70 exists between elements similarly to each of the conventional magnetic heads. However, as shown in FIG. 22, upon writing, the in-gap read sensor 11 can be used for positioning. In this case, the main pole is positioned automatically on a track. Upon reading, the read-only sensor 11' can be used for positioning. Employment of such a configuration therefore can improve the signal-to-noise ratio of the data read sensor 11', thereby the bit error rate can be lowered more than that of the magnetic disk drive described in the fourth embodiment.

What is claimed is:
1. A magnetic head, comprising:
a main pole;
a coil for exciting the main pole;
a trailing shield disposed at the trailing side of the main pole; and
a read sensor disposed between the main pole and the trailing shield;
wherein the read sensor includes a magnetoresistive film that flows a sensing current in a direction of the film thickness; and
wherein the read sensor is supplied the sensing current through the main pole and the trailing shield and wherein the head further includes two sub-poles disposed at the leading side and at the trailing side of the main pole.
2. The magnetic head according to claim 1,
wherein the magnetoresistive film is a giant magnetoresistive film that includes at least two ferromagnetic metal films and a nonmagnetic metal layer formed between those two metal layers or tunneling magnetoresistive metal film that includes at least two ferromagnetic metal layers and a high resistance nonmagnetic layer formed between those two metal layers.
3. The magnetic head according to claim 1,
wherein the magnetic head further includes side shields disposed at both sides of the main pole and the read sensor in the track width direction.
4. The magnetic head according to claim 1,
wherein the main pole and the trailing shield also function as upper and lower magnetic shields of the read sensor respectively.
5. The magnetic head according to claim 1,
wherein the read sensor includes a pinned layer, a free layer, a nonmagnetic metal layer disposed between the pinned layer and the free layer, and an antiferromagnetic layer stacked on the free layer.
6. The magnetic head according to claim 1,
wherein the read sensor includes a pinned layer, a free layer, a high resistance nonmagnetic layer disposed between the pinned layer and the free layer, and an antiferromagnetic layer stacked on the free layer.
7. The magnetic head according to claim 1,
wherein both sides of the main pole in the track width direction and both sides of the read sensor in the track width direction are formed as a continuous plane.
8. The magnetic head according to claim 1,
wherein the magnetic head further includes a sub-pole disposed at the leading side of the main pole.
9. A magnetic disk drive, comprising:
a perpendicular magnetic recording medium; and
a magnetic head that includes a main pole;
a coil for exciting the main pole;
a trailing shield disposed at the trailing side of the main pole; and
a read sensor disposed between the main pole and the trailing shield;
wherein the read sensor of the magnetic head includes a magnetoresistive film for flowing a sensing current in the film thickness direction; and
wherein the read sensor is supplied the sensing current through the main pole and the trailing shield respectively and wherein the head further includes two sub-poles disposed at the leading side and at the trailing side of the main pole.
10. The magnetic disk drive according to claim 9,
wherein the head further includes a side shield disposed at both sides of the main pole and the read sensor in the track width direction.
11. The magnetic disk drive according to claim 9,
wherein the main pole and the trailing shield of the magnetic head also function as upper and lower magnetic shields respectively.
12. The magnetic disk drive according to claim 9,
wherein the read sensor of the magnetic head includes a pinned layer, a free layer, a nonmagnetic metal layer disposed between the pinned layer and the free layer, and a bias layer stacked on the free layer.
13. The magnetic disk drive according to claim 12,
wherein the free layer is disposed closely to a recording position of the main pole.
14. The magnetic disk drive according to claim 9,
wherein the read sensor of the magnetic head includes a pinned layer, a free layer, a high resistance nonmagnetic layer disposed between the pinned layer and the free layer, and a bias layer stacked on the free layer.
15. The magnetic disk drive according to claim 14,
wherein the free layer is disposed closely to a recording position of the main pole.

* * * * *